United States Patent [19]

Sachs

[11] Patent Number: 5,463,750
[45] Date of Patent: Oct. 31, 1995

[54] METHOD AND APPARATUS FOR TRANSLATING VIRTUAL ADDRESSES IN A DATA PROCESSING SYSTEM HAVING MULTIPLE INSTRUCTION PIPELINES AND SEPARATE TLB'S FOR EACH PIPELINE

[75] Inventor: Howard G. Sachs, Belvedere, Calif.

[73] Assignee: Intergraph Corporation, Huntsville, Ala.

[21] Appl. No.: 146,818

[22] Filed: Nov. 2, 1993

[51] Int. Cl.$^6$ ................................................. G06F 12/10
[52] U.S. Cl. ................ 395/496; 364/228; 364/255.7; 364/243.4; 364/DIG. 1; 364/964.343; 364/DIG. 2; 364/955.5; 395/800; 395/421.03; 395/416
[58] Field of Search ................................. 395/400, 425, 395/800

[56] References Cited

U.S. PATENT DOCUMENTS

| | | | |
|---|---|---|---|
| 4,758,951 | 7/1988 | Sznyter, III | 395/400 |
| 4,980,816 | 12/1990 | Fukuzawa et al. | 395/400 |
| 5,197,139 | 3/1993 | Emma et al. | 395/400 |
| 5,226,133 | 7/1993 | Taylor et al. | 395/400 |
| 5,247,629 | 9/1993 | Lasamatta et al. | 395/400 |
| 5,293,612 | 3/1994 | Shingai | 395/425 |
| 5,305,444 | 4/1994 | Becker et al. | 395/400 |
| 5,386,530 | 1/1995 | Hattori | 395/400 |
| 5,404,476 | 4/1995 | Kadaira | 395/400 |
| 5,404,478 | 4/1995 | Arai et al. | 395/400 |
| 5,412,787 | 5/1995 | Forsyth et al. | 395/400 |

*Primary Examiner*—Ken S. Kim
*Attorney, Agent, or Firm*—Townsend and Townsend and Crew

[57] ABSTRACT

A computing system has multiple instruction pipelines, wherein one or more pipelines require translating virtual addresses to real addresses. A TLB is provided for each pipeline requiring address translation services, and an adress translator is provided for each such pipeline for translating a virtual address recieved from its associated pipeline into corresponding real addresses. Each address translator comprises a translation buffer accessing circuit for accessing the TLB, a translation indicating circuit for indicating whether translation data for the virtual address is stored in the translation buffer, and an update control circuit for activating the direct address translation circuit when the translation data for the virtual address is not stored in the TLB. The update control circuit also stores the translation data retrieved from the main memory into the TLB. If it is desired to have the same translation information available for all the pipelines in a group, then the update control circuit also updates all the other TLB's in the group.

14 Claims, 4 Drawing Sheets

RM = $2^{12}$ PAGES
PAGE = $2^{12}$ BYTES

METHOD AND APPARATUS FOR TRANSLATING VIRTUAL ADDRESSES IN A DATA PROCESSING SYSTEM HAVING MULTIPLE INSTRUCTION PIPELINES AND SEPARATE TLB'S FOR EACH PIPELINE

BACKGROUND OF THE INVENTION

The present invention relates to computing systems and, more particularly, to a method and apparatus for translating virtual addresses in a computing system having multiple instruction pipelines.

FIG. 1 is a block diagram of a typical computing system 10 which employs virtual addressing of data. Computing system 10 includes an instruction issuing unit 14 which communicates instructions to a plurality of (e.g., eight) instruction pipelines 18A–H over a communication path 22. The data referred to by the instructions in a program are stored in a mass storage device 30 which may be, for example, a disk or tape drive. Since mass storage devices operate very slowly (e.g., a million or more clock cycles per access) compared to instruction issuing unit 14 and instruction pipelines 18A–H, data currently being worked on by the program is stored in a main memory 34 which may be a random access memory (RAM) capable of providing data to the program at a much faster rate (e.g., 30 or so clock cycles). Data stored in main memory 34 is transferred to and from mass storage device 30 over a communication path 42. The communication of data between main memory 34 and mass storage device 30 is controlled by a data transfer unit 46 which communicates with main memory 34 over a communication path 50 and with mass storage device 30 over a communication path 54.

Although main memory 34 operates much faster than mass storage device 30, it still does not operate as quickly as instruction issuing unit 14 or instruction pipelines 18A–H. Consequently, computing system 10 includes a high speed cache memory 60 for storing a subset of data from main memory 34, and a very high speed register file 64 for storing a subset of data from cache memory 60. Cache memory 60 communicates with main memory 34 over a communication path 68 and with register file 64 over a communication path 72. Register file 64 communicates with instruction pipelines 18A–H over a communication path 76. Register file 64 operates at approximately the same speed as instruction issuing unit 14 and instruction pipelines 18A–H (e.g., a fraction of a clock cycle), whereas cache memory 60 operates at a speed somewhere between register file 64 and main memory 34 (e.g., approximately two or three clock cycles).

FIGS. 2A–B are block diagrams illustrating the concept of virtual addressing. Assume computing system 10 has 32 bits available to address data. The addressable memory space is then $2^{32}$ bytes, or four gigabytes (4 GB), as shown in FIG. 2A. However, the physical (real) memory available in main memory 34 typically is much less than that, e.g., 1–256 megabytes. Assuming a 16 megabyte (16 MB) real memory, as shown in FIG. 2B, only 24 address bits are needed to address the memory. Thus, multiple virtual addresses inevitably will be translated to the same real address used to address main memory 34. The same is true for cache memory 60, which typically stores only 1–36 kilobytes of data. Register file 64 typically comprises, e.g., 32 32-bit registers, and it stores data from cache memory 60 as needed. The registers are addressed by instruction pipelines 18A–H using a different addressing scheme.

To accommodate the difference between virtual addresses and real addresses and the mapping between them, the physical memory available in computing system 10 is divided into a set of uniform-size blocks, called pages. If a page contains $2^{12}$ or 4 kilobytes (4 KB), then the full 32-bit address space contains $2^{20}$ or 1 million (1M) pages (4 KB×1M=4 GB). Of course, if main memory 34 has 16 megabytes of memory, only $2^{12}$ or 4K of the 1 million potential pages actually could be in memory at the same time (4K×4 KB=16 MB).

Computing system 10 keeps track of which pages of data from the 4 GB address space currently reside in main memory 34 (and exactly where each page of data is physically located in main memory 34) by means of a set of page tables 100 (FIG. 3) typically stored in main memory 34. Assume computing system 10 specifies 4 KB pages and each page table 100 contains 1K entries for providing the location of 1K separate pages. Thus, each page table maps 4 MB of memory (1K×4KB=4 MB), and 4 page tables suffice for a machine with 16 megabytes of physical main memory (16 MB/4 MB=4).

The set of potential page tables are tracked by a page directory 104 which may contain, for example, 1K entries (not all of which need to be used). The starting location of this directory (its origin) is stored in a page directory origin (PDO) register 108.

To locate a page in main memory 34, the input virtual address is conceptually split into a 12-bit displacement address (VA<11:0>), a 10-bit page table address (VA<21:12>) for accessing page table 100, and a 10-bit directory address (<VA 31:22>) for accessing page directory 104. The address stored in PDO register 108 is added to the directory address VA<31:22> of the input virtual address in a page directory entry address accumulator 112. The address in page directory entry address accumulator 112 is used to address page directory 104 to obtain the starting address of page table 100. The starting address of page table 100 is then added to the page table address VA<21:12> of the input virtual address in a page table entry address accumulator 116, and the resulting address is used to address page table 100. An address field in the addressed page table entry gives the starting location of the page in main memory 34 corresponding to the input virtual address, and a page fault field PF indicates whether the page is actually present in main memory 34. The location of data within each page is typically specified by the 12 lower-order displacement bits of the virtual address.

When an instruction uses data that is not currently stored in main memory 34, a page fault occurs, and the faulting instruction abnormally terminates. Thereafter, data transfer unit 42 must find an unused 4 KB portion of memory in main memory 34, transfer the requested page from mass storage device 30 into main memory 34, and make the appropriate update to the page table (indicating both the presence and location of the page in memory). The program then may be restarted.

FIG. 4 is a block diagram showing how virtual addresses are translated in the computing system shown in FIG. 1. Components which remain the same as FIGS. 1 and 3 retain their original numbering. An address register 154 receives an input virtual address which references data used by an instruction issued to one of instruction pipelines 14A–H, a translation memory (e.g., a translation lookaside buffer (TLB)) 158 and comparator 170 for initially determining whether data requested by the input virtual address resides in main memory 34, and a dynamic translation unit (DTU)

162 for accessing page tables in main memory 34. Bits VA[18:12] of the input virtual address are communicated to TLB 158 over a communication path 166, bits VA[31:12] of the input virtual address are communicated to DTU 162 over a communication path 174, and bits VA[31:19] are communicated to comparator 170 over a communication path 176.

TLB 158 includes a plurality of addressable storage locations 178 that are addressed by bits VA[18:12] of the input virtual address. Each storage location stores a virtual address tag (VAT) 180, a real address (RA) 182 corresponding to the virtual address tag, and control information (CNTRL) 184. How much control information is included depends on the particular design and may include, for example, access protection flags, dirty flags, referenced flags, etc.

The addressed virtual address tag is communicated to comparator 170 over a communication path 186, and the addressed real address is output on a communication path 188. Comparator 170 compares the virtual address tag with bits VA[31:22] of the input virtual address. If they match (a TLB hit), then the real address output on communication path 188 is compared with a real address tag (not shown) of a selected line in cache memory 60 to determine if the requested data is in the cache memory (a cache hit). An example of this procedure is discussed in U.S. Pat. No. 4,933,835 issued to Howard G. Sachs, et al. and incorporated herein by reference. If there is a cache hit, then the pipelines may continue to run at their highest sustainable speed. If the requested data is not in cache memory 60, then the real address bits on communication path 188 are combined with bits [11:0] of the input virtual address and used to obtain the requested data from main memory 34.

If the virtual address tag did not match bits VA[31:19] of the input virtual address, then comparator 170 provides a miss signal on a communication path 190 to DTU 162. The miss signal indicates that the requested data is not currently stored in main memory 34, or else the data is in fact present in main memory 34 but the corresponding entry in TLB 158 has been deleted.

When the miss signal is generated, DTU 162 accesses the page tables in main memory 34 to determine whether in fact the requested data is currently stored in main memory 34. If not, then DTU 162 instructs data transfer unit 42 through a communication path 194 to fetch the page containing the requested data from mass storage device 30. In any event, TLB 158 is updated through a communication path 196, and instruction issuing resumes.

TLB 158 has multiple ports to accommodate the addresses from the pipelines needing address translation services. For example, if two load instruction pipelines and one store instruction pipeline are used in computing system 10, then TLB 158 has three ports, and the single memory array in TLB 158 is used to service all address translation requests.

As noted above, new virtual-to-real address translation information is stored in TLB 158 whenever a miss signal is generated by comparator 170. The new translation information typically replaces the oldest and least used entry presently stored in TLB 158. While this mode of operation is ordinarily desirable, it may have disadvantages when a single memory array is used to service address translation requests from multiple pipelines. For example, if each pipeline refers to different areas of memory each time an address is to be translated, then the translation information stored in TLB 158 for one pipeline may not get very old before it is replaced by the translation information obtained by DTU 162 for the same or another pipeline at a later time. This increases the chance that DTU 162 will have to be activated more often, which degrades performance. The effect is particularly severe and counterproductive when a first pipeline repeatedly refers to the same general area of memory, but the translation information is replaced by the other pipelines between accesses by the first pipeline.

SUMMARY OF THE INVENTION

The present invention is directed to a method and apparatus for translating virtual addresses in a computing system having multiple pipelines wherein a separate TLB is provided for each pipeline requiring address translation services. Each TLB may operate independently so that it contains its own set of virtual-to-real address translations, or else each TLB in a selected group may be simultaneously updated with the same address translation information whenever the address translation tables in main memory are accessed to obtain address translation information for any other TLB in the group.

In one embodiment of the present invention, a TLB is provided for each load/store pipeline in the system, and an address translator is provided for each such pipeline for translating a virtual address recieved from its associated pipeline into corresponding real addresses. Each address translator comprises a translation buffer accessing circuit for accessing the TLB, a translation indicating circuit for indicating whether translation data for the virtual address is stored in the translation buffer, and an update control circuit for activating the direct address translation circuit when the translation data for the virtual address is not stored in the TLB. The update control circuit also stores the translation data retrieved from the main memory into the TLB. If it is desired to have the same translation information available for all the pipelines in a group, then the update control circuit also updates all the other TLB's in the group.

BRIEF DESCRIPTION OF THE PREFERRED EMBODIMENTS

Figure 1:
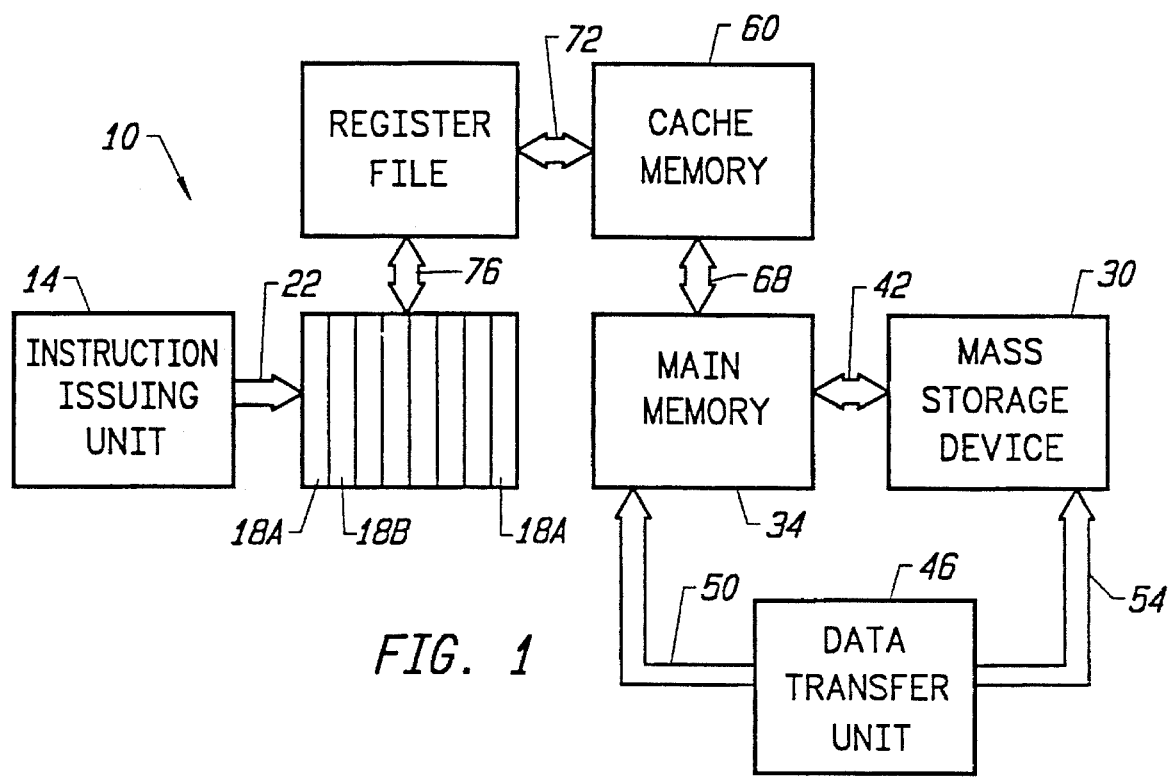
FIG. 1 is a block diagram of a known computing system.
Figure 2A:
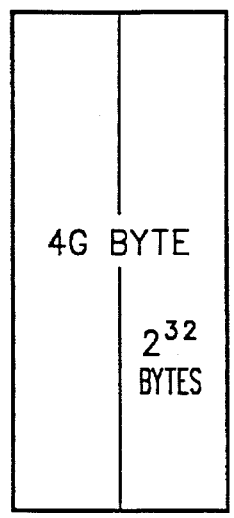
FIGS. 2A and 2B are each diagrams illustrating virtual addressing.
Figure 2B:
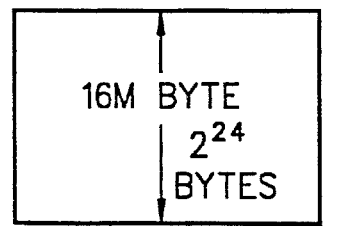
Figure 3:
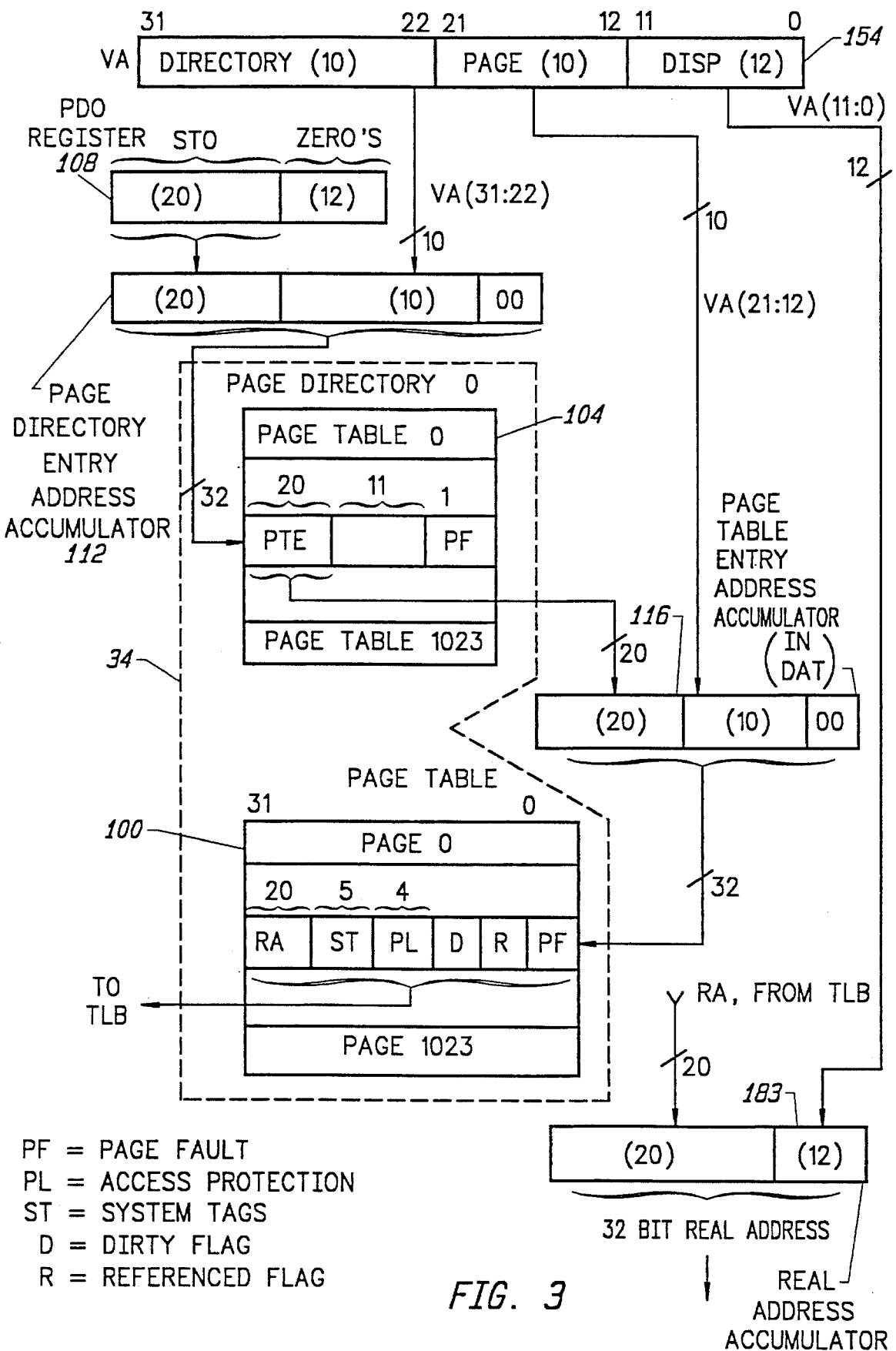
FIG. 3 is a diagram showing how page tables are accessed in the computing system shown in FIG. 1.
Figure 4:
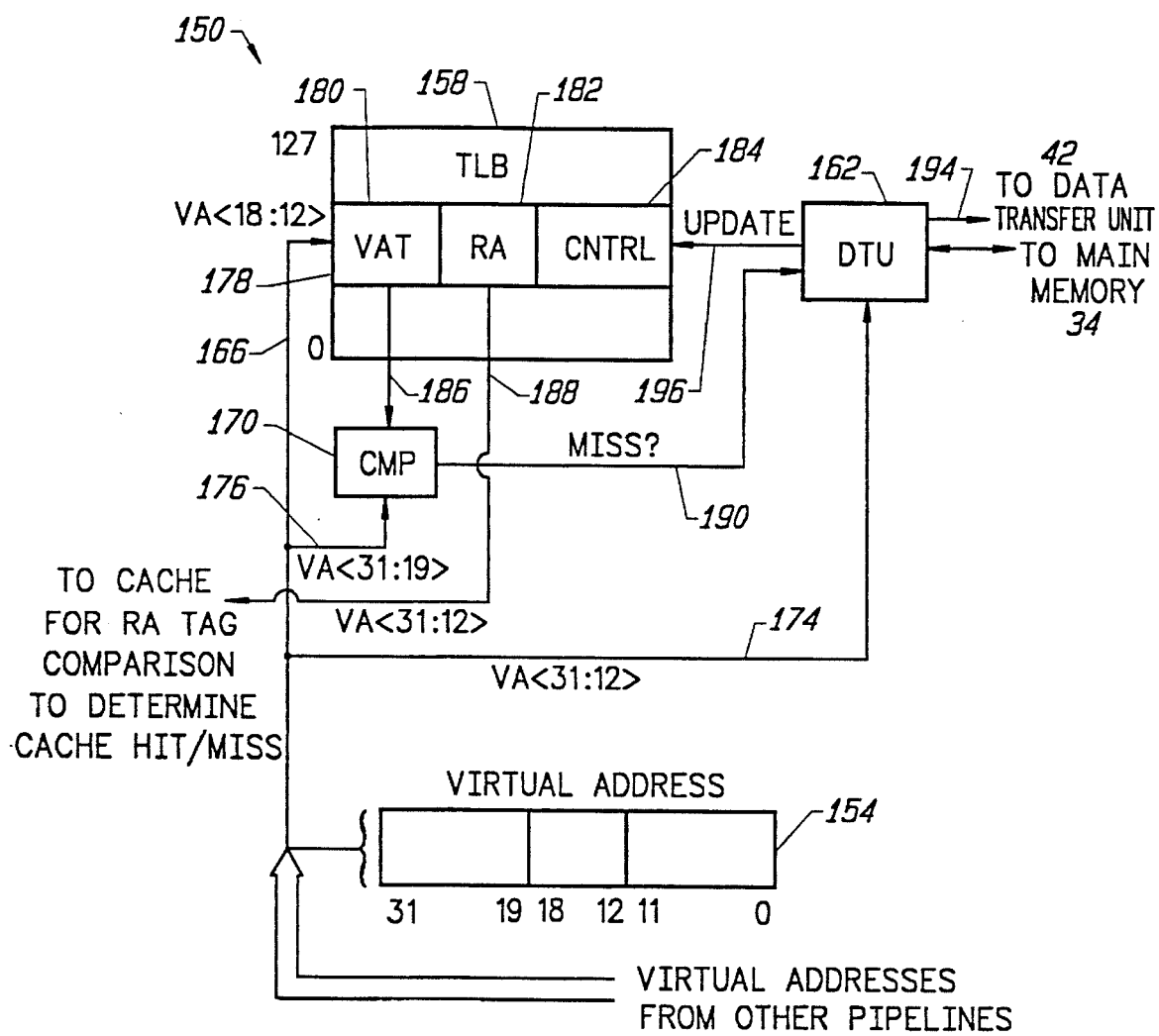
FIG. 4 is a block diagram illustrating how virtual addresses are translated in the computing system shown in FIG. 1.
Figure 5:
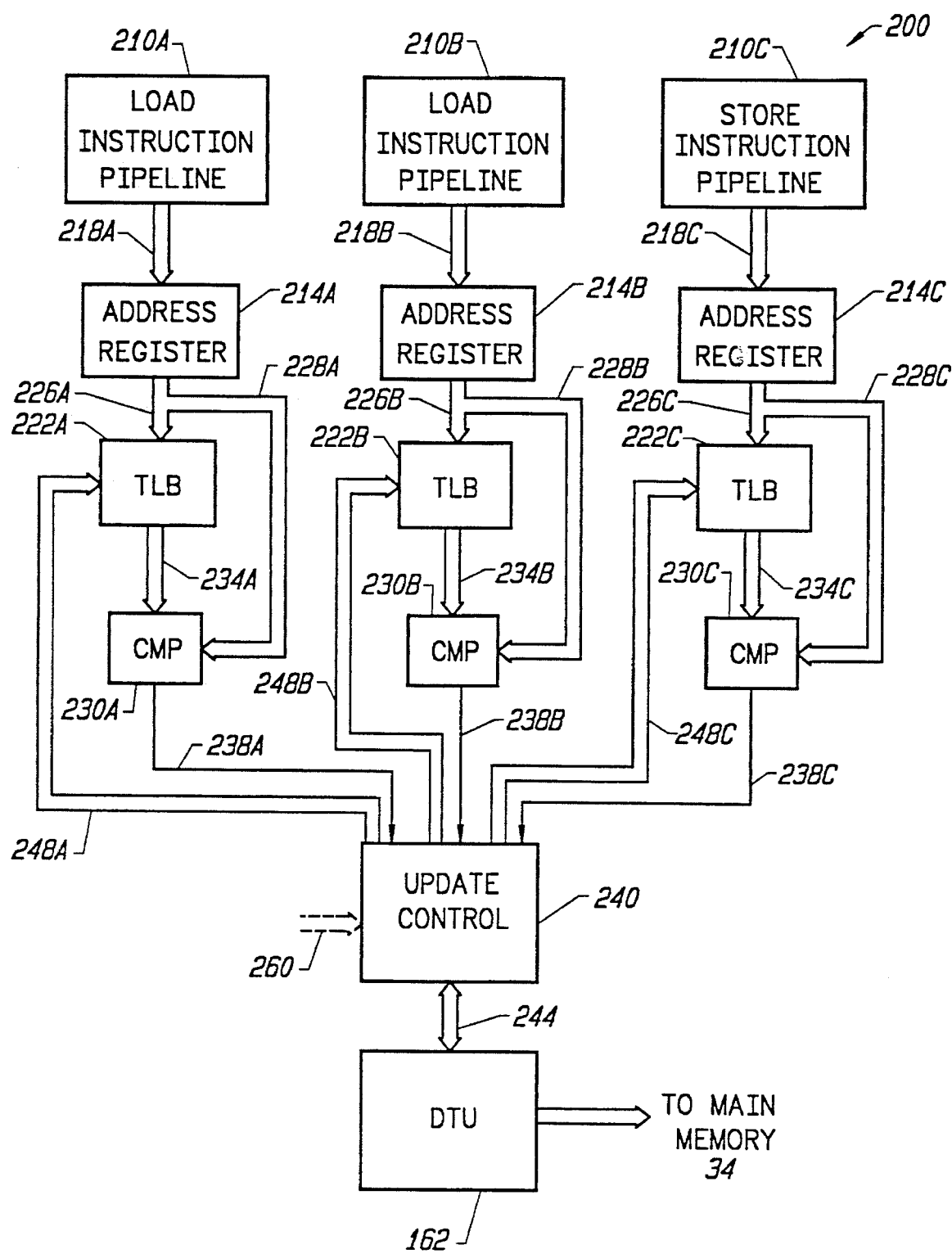
FIG. 5 is a block diagram of a particular embodiment of a multiple TLB apparatus for translating virtual addresses in a computing system according to the present invention.

FIG. 5 is a block diagram of a particular embodiment of an apparatus 200 according to the present invention for translating virtual addresses in a computing system such as computing system 10 shown in FIG. 1. Apparatus 200 includes, for example, a load instruction pipeline 210A, a load instruction pipeline 210B, and a store instruction pipeline 210C. These pipelines may be three of the pipelines 18A–H shown in FIG. 1. Pipelines 210A–C communicate virtual addresses to address registers 214A–C over respective communication paths 218A–C. Relevant portions of the virtual addresses stored in address registers 218A–C are communicated to TLB's 222A–C and to comparators 230A–C over communication paths 226A–C and 228A–C, respectively. TLB's 222A–C are accessed in the manner noted in the Background of the Invention, and the addressed virtual address tags in each TLB are communicated to comparators 230A–C over respective communication paths 234A–C. Comparators 238A–C compare the virtual address tags to the higher order bits of the respective virtual addresses and provide hit/miss signals on communication paths 238A–C to an update control circuit 240.

Update control circuit 240 controls the operation of DTU 162 through a communication path 244 and updates TLB's 222A–C through respective update circuits 241–243 and communication paths 248A–C whenever there is a miss signal generated on one or more of communication paths 238A–C. That is, update control circuit 240 activates DTU 162 whenever a miss signal is received over communication path 238A and stores the desired translation information in TLB 222A through communication path 248A; update control circuit 240 activates DTU 162 whenever a miss signal is received over communication path 238B and stores the desired translation information in TLB 222B through communication path 248B; and update control circuit 240 activates DTU 162 whenever a miss signal is received over communication path 238C and stores the desired translation information in TLB 222C through communication path 248C.

If desired, each TLB 222A–C may be updated independently of the others, which results in separate and independent sets of virtual-to-real address translation data in each TLB. Thus, if, for example, pipeline 210A tends to refer to a particular area of memory more than the other pipelines 210B–C, then TLB 222A will store a set of virtual-to-real address translations that maximize the hit rate for pipeline 210A. Even if pipeline 210A does not favor a particular area of memory, having a separate and independent set of virtual-to-real address translation data eliminates the possibility that needed translation information in TLB 222A is deleted and replaced by translation data for another pipeline.

If all three pipelines tend to refer to a common area of memory, then update control circuit 240 can be hardware or software programmed to simultaneously update all TLB's with the same translation data whenever the address translation tables in main memory are accessed to obtain address translation information for any other TLB. That is, every time DTU 162 is activated for translating a virtual address supplied by pipeline 210A, then update control circuit stores the translation data in each of TLB's 222A–C. While this mode of operation resembles that described for a multi-ported TLB as described in the Background of the Invention, this embodiment still has benefits in that three separate single-port TLB's are easier to implement than one multi-port TLB and takes up only slightly more chip area.

If one group of pipelines tends to refer to a common area of memory and other pipelines do not, then update control circuit 240 can be hardware or software programmed to maintain a common set of translations in the TLB's associated with the group while independently updating the other TLB's. For example, if load pipelines 210A and 210B tend to refer to a common area in memory and store pipeline 210C tends to refer to a different area of memory (or to random areas of memory), then control circuit 240 activates DTU 162 whenever a miss signal is received over communication path 238A and stores the desired translation information in both TLB 222A and TLB 222B. Similarly, update control circuit 240 activates DTU 162 whenever a miss signal is received over communication path 238B and stores the desired translation information in both TLB 222A and TLB 222B. On the other hand, update control circuit 240 activates DTU 162 whenever a miss signal is received over communication path 238C and stores the desired translation information only in TLB 222C.

While the above is a complete description of a preferred embodiment of the present invention, various modifications may be employed. For example, signals on a communication path 260 could be used to control which TLB's are commonly updated and which TLB's are separately updated (e.g., all TLB's updated independently, TLB's 222A and 222C updated in common while TLB 222B is updated independently, or TLB's 222A–C all updated in common). That is useful when common memory references by the pipelines are application or program dependent. Consequently, the scope of the invention should be ascertained by the following claims.

What is claimed is:

1. An apparatus for translating virtual addresses in a computing system having at least a first and a second instruction pipeline and a direct address translation unit for translating virtual addresses into real addresses, the direct address translation unit including a master translation memory for storing translation data, the direct address translation unit for translating a virtual address into a corresponding real address, comprising:

a first translation buffer, associated with the first instruction pipeline, for storing a first subset of translation data from the master translation memory;

a first address translator, coupled to the first instruction pipeline and to the first translation buffer, for translating a first virtual address received from the first instruction pipeline into a corresponding first real address, the first address translator comprising:

first translation buffer accessing means for accessing the first translation buffer;

first translation indicating means, coupled to the first translation buffer accessing means, for indicating whether translation data for the first virtual address is stored in the first translation buffer; and first direct address translating means, coupled to the first translation indicating means and to the direct address translation unit to translate the first virtual address when the first translation indicating means indicates that the translation data for the first virtual address is not stored in the first translation buffer, the first direct address translating means including first translation buffer storing means, coupled to the first translation buffer, for storing the translation data for the first virtual address from the master translation memory into the first translation buffer;

a second translation buffer, associated with the second instruction pipeline, for storing a second subset of translation data from the master translation memory; and a second address translator, coupled to the second instruction pipeline and to the second translation buffer, for translating a second virtual address received from the second instruction pipeline into a corresponding second real address, the second address translator comprising:

second translation buffer accessing means for accessing the second translation buffer;

second translation indicating means, coupled to the second translation buffer accessing means, for indicating whether translation data for the second virtual address is stored in the second translation buffer; and second direct address translating means, coupled to the second translation indicating means and to the first address translation unit, for activating the direct address translation unit to translate the second virtual address when the second translation indicating means indicates that the translation data for the second virtual address is not stored in the second translation buffer, the second direct address translating means including second translation buffer storing means, coupled to the second translation buffer, for storing the translation data for the second virtual address from the master translation memory into the second translation buffer.

2. The apparatus according to claim 1,
wherein the first direct address translating means further comprises second translation buffer storing means, coupled to the second translation buffer, for storing the translation data for the first virtual address from the master translation memory into the second translation buffer.

3. The apparatus according to claim 2:
wherein the second direct address translating means further comprises first translation buffer storage means, coupled to the first translation buffer, for storing the translation data for the second virtual address from the master translation memory into the first translation buffer.

4. The apparatus according to claim 3 further comprising:
a third translation buffer, associated with a third instruction pipeline, for storing a third subset of translation data from the master translation memory;
a third address translator, coupled to the third instruction pipeline and to the third translation buffer, for translating a third virtual address received from the third instruction pipeline into a corresponding third real address, the third address translator comprising:
third translation buffer accessing means for accessing the third translation buffer;
third translation indicating means, coupled to the third translation buffer accessing means, for indicating whether translation data for the third virtual address is stored in the third translation buffer; and
third direct address translating means, coupled to the third translation indicating means and to the direct address translation unit, for activating the direct address translation unit to translate the third virtual address when the third translation indicating means indicates that the translation data for the third virtual address is not stored in the third translation buffer, the third direct address translating means including third translation buffer storing means, coupled to the third translation buffer, for storing the translation data for the third virtual address from the master translation memory into the third translation buffer.

5. The apparatus according to claim 4,
wherein the third translation buffer storing means is the only means for storing translation data into the third translation buffer.

6. The apparatus according to claim 5,
wherein the first instruction pipeline comprises a first load instruction pipeline for processing instructions which cause data to be loaded from a memory; and
wherein the third instruction pipeline comprises a store instruction pipeline for processing instructions which cause data to be stored into the memory.

7. The apparatus according to claim 6,
wherein the second instruction pipeline comprises a second load instruction pipeline for processing instructions which cause data to be loaded from the memory.

8. A method for translating virtual addresses in a computing system having at least a first and a second instruction pipeline and a direct address translation unit for translating virtual addresses into real addresses, the direct address translation unit including a master translation memory for storing translation data, the direct address translation unit for translating a virtual address into a corresponding real address, comprising the steps of:
storing a first subset of translation data from the master translation memory into a first translation buffer associated with the first instruction pipeline;
translating a first virtual address received from the first instruction pipeline into a corresponding first real address, wherein the first virtual address translating step comprises the steps of:
accessing the first translation buffer;
indicating whether translation data for the first virtual address is stored in the first translation buffer;
activating the direct address translation unit to translate the first virtual address when the translation data for the first virtual address is not stored in the first translation buffer; and
storing the translation data for the first virtual address from the master translation memory into the first translation buffer;
storing a second subset of translation data from the master translation memory into a second translation buffer associated with the second instruction pipeline; and
translating a second virtual address received from the second instruction pipeline into a corresponding second real address, wherein the second virtual address translating step comprises the steps of:
accessing the second translation buffer;
indicating whether translation data for the second virtual address is stored in the second translation buffer;
activating the direct address translation unit to translate the second virtual address when the translation data for the second virtual address is not stored in the second translation buffer; and
storing the translation data for the second virtual address from the master translation memory into the second translation buffer.

9. The method according to claim 8 further comprising the step of:
storing the translation data for the first virtual address from the master translation memory into the second translation buffer whenever translation data for the first virtual address from the master translating memory is stored into the first translation buffer.

10. The method according to claim 9 further comprising the step of:
storing the translation data for the second virtual address from the master translation memory into the first translation buffer whenever translation data for the second virtual address from the master translation memory is stored into the second translation buffer.

11. The method according to claim 10 further comprising the steps of:
storing a third subset of translation data from the master translation memory into a third translation buffer associated with the third instruction pipeline; and
translating a third virtual address received from the third instruction pipeline into a corresponding third real address, where in the third virtual address translating step comprises the steps of:

accessing the third translation buffer;

indicating whether translation data for the third virtual address is stored in the third translation buffer;

activating the direct address translation unit to translate the third virtual address when the translation data for the third virtual address is not stored in the third translation buffer; and storing the translation data for the third virtual address from the master translation memory into the third translation buffer.

12. The method according to claim 11, wherein the step of storing the translation data for the third virtual address comprises the step of storing translation data for only the third virtual address in the third translation buffer.

13. The method according to claim 12, wherein the first instruction pipeline comprises a first load instruction pipeline for processing instructions which cause data to be loaded from a memory; and wherein the third instruction pipeline comprises a store instruction pipeline for processing instructions which cause data to be stored in the memory.

14. The method according to claim 13, wherein the second instruction pipeline comprises a second load instruction pipeline for processing instructions which cause data to be loaded from the memory.

* * * * *